United States Patent [19]

Nada

[11] Patent Number: 5,099,646

[45] Date of Patent: Mar. 31, 1992

[54] AIR-FUEL RATIO FEEDBACK CONTROL SYSTEM HAVING A SINGLE AIR-FUEL RATIO SENSOR DOWNSTREAM OF A THREE-WAY CATALYST CONVERTER

[75] Inventor: Mitsuhiro Nada, Susono, Japan

[73] Assignee: Toyota Jidosha Kabushiki Kaisha, Toyota, Japan

[21] Appl. No.: 725,617

[22] Filed: Jul. 2, 1991

[30] Foreign Application Priority Data

Jul. 16, 1990 [JP] Japan .................. 2-185267

[51] Int. Cl.⁵ .................. F02D 41/14
[52] U.S. Cl. .................. 60/274; 60/276; 60/277; 60/285
[58] Field of Search .................. 60/274, 276, 277, 285

[56] References Cited

U.S. PATENT DOCUMENTS 5,017,952 5/1991 Nada .................. 60/274
5,052,177 10/1991 Nada .................. 60/274
5,070,692 12/1991 Nada .................. 60/274
5,070,693 12/1991 Nada .................. 60/274

FOREIGN PATENT DOCUMENTS 58-48745 3/1983 Japan .
64-53042 3/1989 Japan .
0230935 9/1990 Japan .................. 123/489

Primary Examiner—Ira S. Lazarus
Assistant Examiner—L. Heyman
Attorney, Agent, or Firm—Kenyon & Kenyon

[57] ABSTRACT

In an air-fuel ratio feedback control system including a single air-fuel ratio sensor downstream of a three-way catalyst converter, the coarse-adjusting term and the $O_2$ adjusting term are calculated in accordance with the air-fuel ratio sensor, and an initial timing of the $O_2$ adjusting term is delayed when the catalyst converter is deteriorated, to thus improve the drivability of a vehicle.

14 Claims, 16 Drawing Sheets

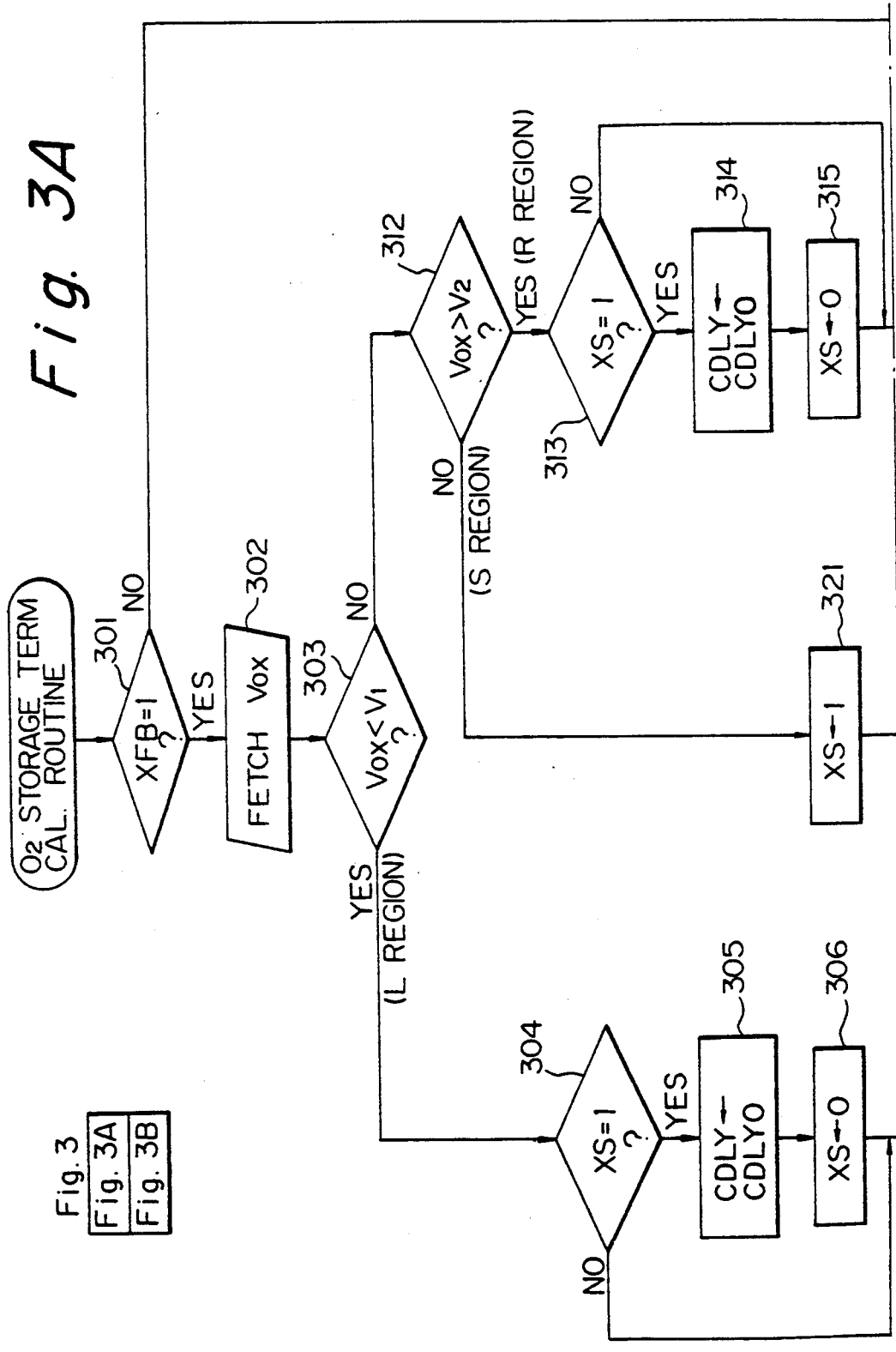

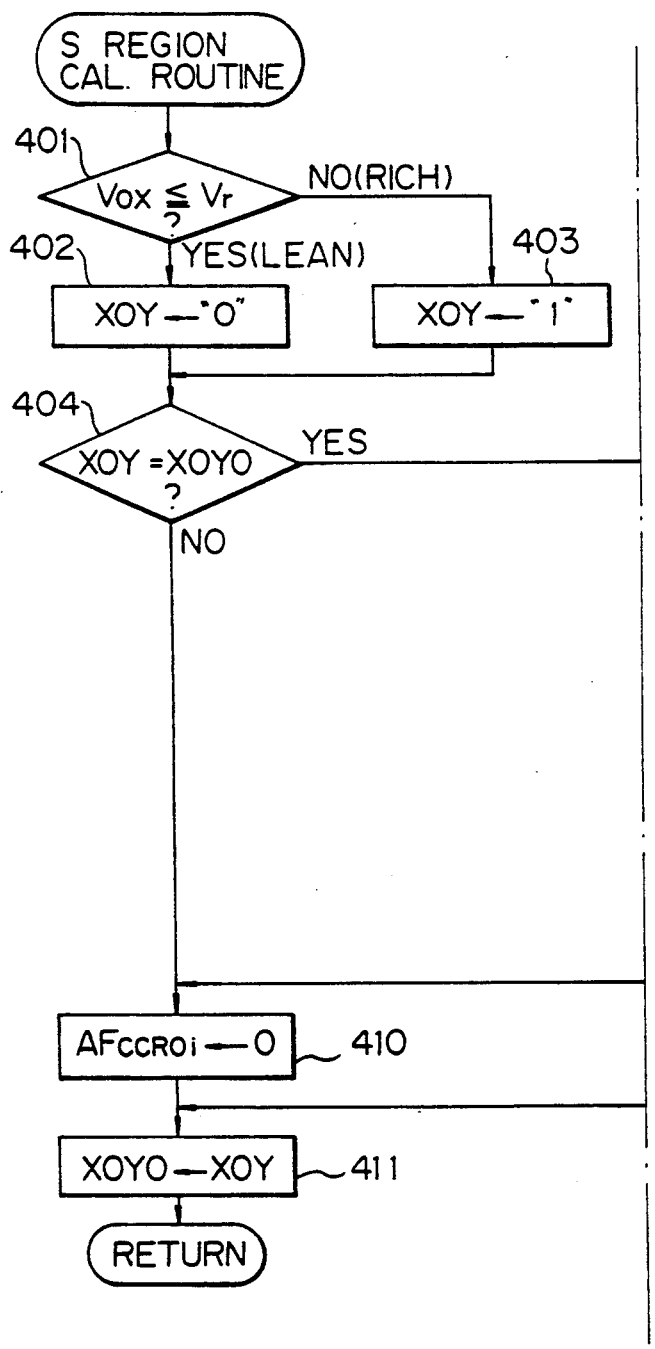

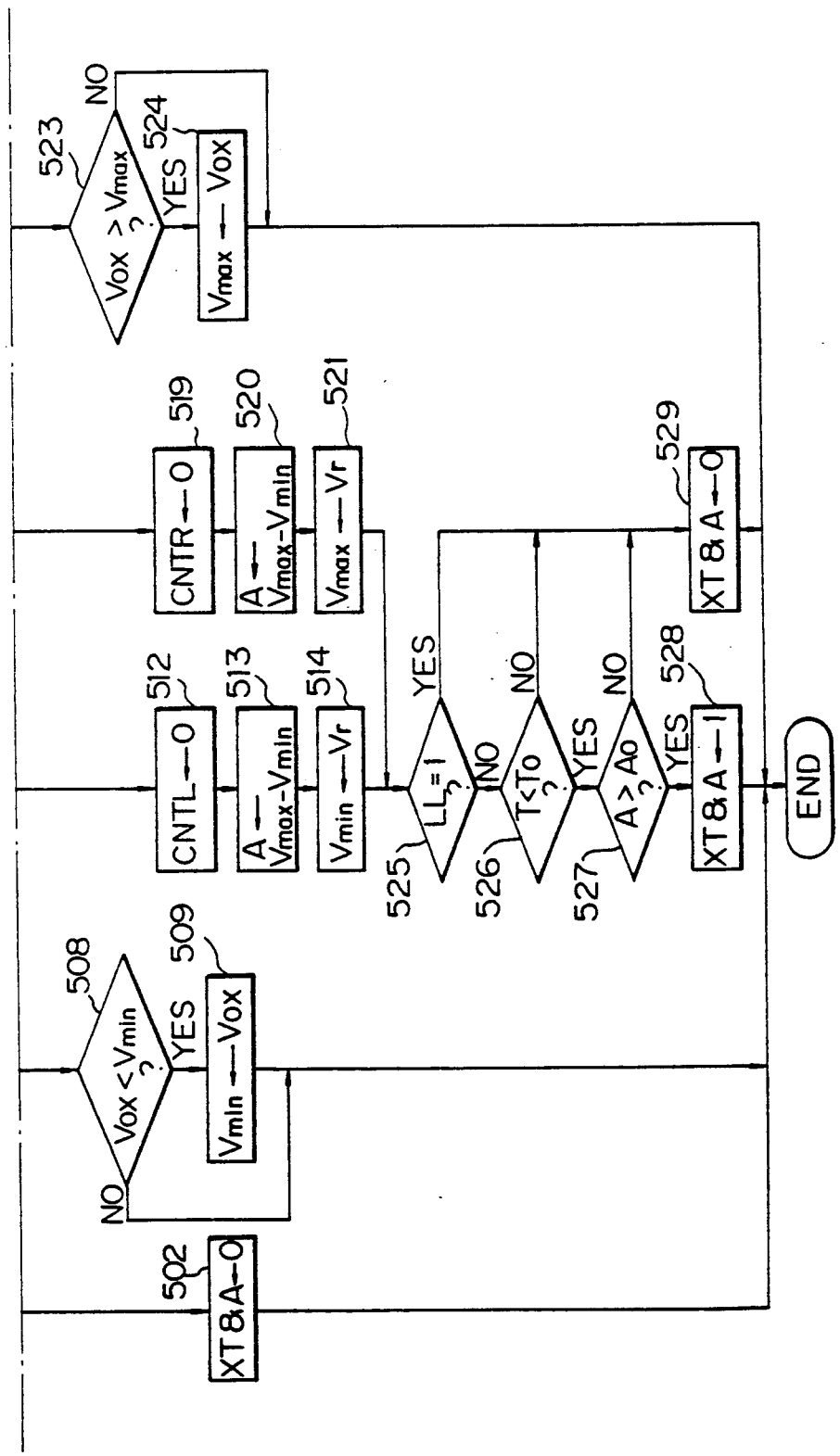

AIR-FUEL RATIO FEEDBACK CONTROL SYSTEM HAVING A SINGLE AIR-FUEL RATIO SENSOR DOWNSTREAM OF A THREE-WAY CATALYST CONVERTER

BACKGROUND OF THE INVENTION

1. Field of the Invention

The present invention relates to an air-fuel ratio feedback control system in an internal combustion engine having a single air-fuel ratio sensor downstream of a three-way reducing and oxidizing catalyst converter in an exhaust gas passage.

2. Description of the Related Art

Among known air-fuel ratio feedback control systems using air-fuel ratio sensors ($O_2$ sensors), there exists a single air-fuel ratio sensor system, i.e., having a only one air-fuel ratio sensor. Note, in this system the air-fuel ratio sensor is disposed either upstream or downstream of the catalyst converter.

In a single air-fuel ratio sensor system having an air-fuel ratio sensor upstream of the catalyst converter, the air-fuel ratio sensor is disposed in the exhaust gas passage near to a combustion chamber, i.e., near the concentration portion of an exhaust manifold. In this system, however, the output characteristics of the air-fuel ratio sensor are directly affected by a non-uniformity or non-equilibrium state of the exhaust gas. For example, when the air-fuel ratio actually indicates a rich state but oxygen is still present, the output characteristics of the air-fuel ratio sensor fluctuate. Also, in an internal combustion engine having a plurality of cylinders, the output characteristics of the air-fuel ratio sensor are also directly affected by differences in individual cylinders, and accordingly, it is impossible to detect the mean air-fuel ratio for the entire engine, and thus the accuracy of the control of the air-fuel ratio is low.

On the other hand, in a single air-fuel ratio sensor system having an air-fuel ratio sensor downstream of the catalyst converter, the non-uniformity or non-equilibrium state of the detected exhaust gas has little or no effect, and thus the mean air-fuel ratio for the engine can be detected In this system, however, due to the capacity of the catalyst converter, the response characteristics of the air-fuel ratio sensor are lowered, and as a result, the efficiency of the catalyst converter cannot be properly exhibited, and thus the HC, CO and $NO_x$ emissions are increased.

To solve the above problems, the following method, for example, is known. Namely, the actual air-fuel ratio is adjusted by a self-oscillating term, and the mean value thereof, i.e., a coarse-adjusting term, is controlled in accordance with the output of the air-fuel ratio sensor disposed downstream of the catalyst converter.

Nevertheless, this method cannot eliminate the increase of HC, CO and $NO_x$ emissions, because a convergence error in the stoichiometric air-fuel ratio occurs due to the phase-difference between the input and output of the exhaust gas, which is caused by the low response of the air-fuel ratio sensor.

To solve the above problem, the preset inventor have suggested a method of using a proportional $O_2$ storage term and an integral $O_2$ storage term, to forcibly shift the coarse-adjusting term when the output of the air-fuel ratio sensor disposed downstream of the catalyst converter is outside a predetermined region, in addition to the air-fuel ratio control by the coarse-adjusting term (see Japanese Unexamined Patent Application (Kokai) No. 1-66441 published on Mar. 13, 1989).

Nevertheless, the above method cannot eliminate the increase of HC, CO and $NO_x$ emissions when the catalyst converter is deteriorated, because the $O_2$ storage effect of the catalyst converter is reduced.

As a result, the proportional $O_2$ storage term is continuously used, and accordingly, the drivability becomes poor because the air-fuel ratio sensor detects the air-fuel ratio of the exhaust gas having a large fluctuation.

SUMMARY OF THE INVENTION

Therefore, an object of the present invention is to provide a air-fuel ratio control system able to prevent a poor drivability.

According to this invention, in an air-fuel ratio feedback control system including a single air-fuel ratio sensor disposed downstream of a three-way catalyst converter, a coarse-adjusting term AFc is calculated integrally when the output of the air-fuel sensor is not inverted, and calculated proportionally when the output is inverted, and an $O_2$ storage term is calculated at least proportionally when the output of the air-fuel sensor is outside a predetermined region.

Namely, a timing of the initiating the proportional $O_2$ storage term is delayed when the catalyst converter is deteriorated.

BRIEF DESCRIPTION OF THE DRAWINGS

The present invention will be more clearly understood from the description as set forth below with reference to the accompanying drawings.

DESCRIPTION OF THE PREFERRED EMBODIMENTS

Figure 1:
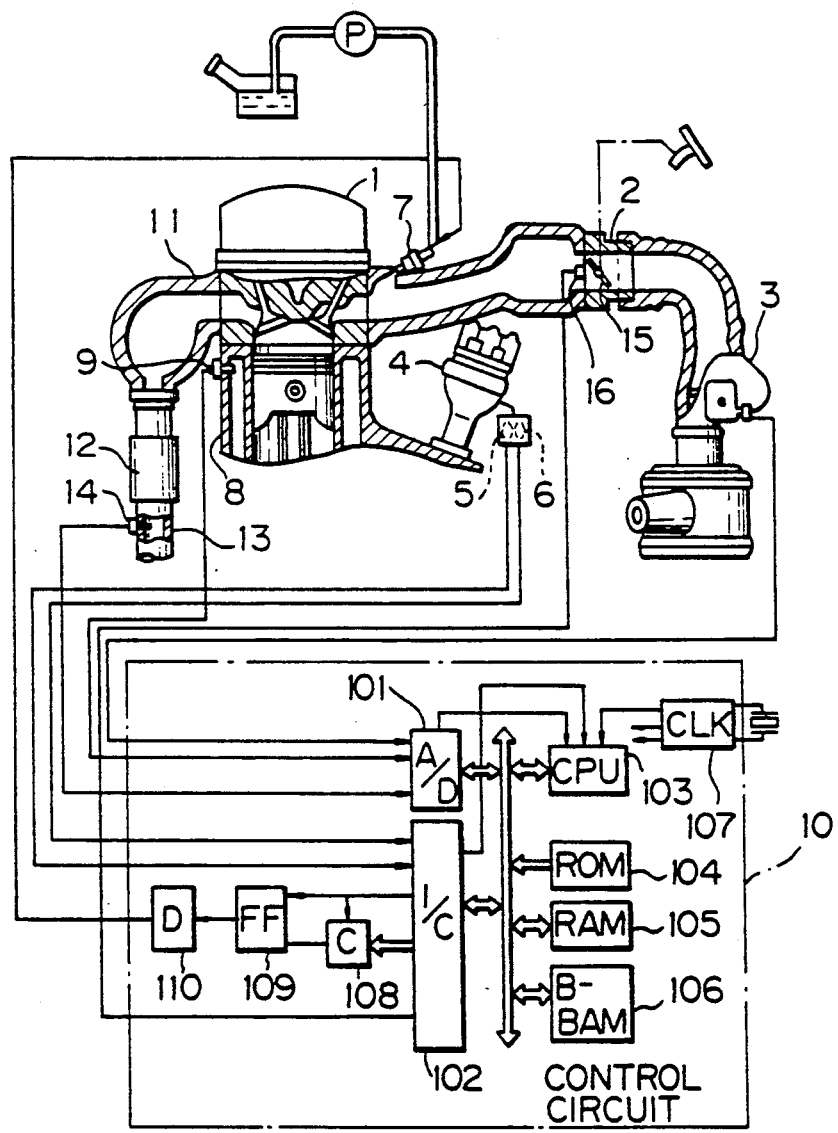
FIG. 1 is a schematic view of an internal combustion engine according to the present invention.

In FIG. 1, which illustrates an internal combustion engine according to the present invention, reference numeral 1 designates a four-cycle spark ignition engine disposed in an automotive vehicle, wherein an air-intake passage 2 of the engine 1 is provided with a potentiometer-type airflow meter 3 for detecting an amount of air drawn into the engine 1, and generating an analog voltage signal proportional to the amount of air flowing therethrough. The signal from the air-flow meter 3 is transmitted to a multiplexer-incorporating analog-to-digital (A/D) converter 101 of the control circuit 10.

Crank angle sensors 5 and 6, for detecting the angle of the crank-shaft (not shown) of the engine 1, are disposed at a distributor 4.

In this case, the crank angle sensor 5 generates a pulse signal at every 720° crank angle (CA) and the crank-angle sensor 6 generates a pulse signal at every 30° CA. The pulse signals from the crank angle sensors 5 and 6 are supplied to an input/output (I/O) interface 102 of the control circuit 10. Further, the pulse signal from the crank angle sensor 6 is then supplied to an interruption terminal of a central processing unit (CPU) 103.

Also provided in the air-intake passage 2 is a fuel injection valve 7 for supplying pressurized fuel from the fuel system to the air-intake port of the cylinder of the engine 1. Note, other fuel injection valves are provided for other cylinders, but these are not shown in FIG. 1.

A coolant temperature sensor 9 for detecting the temperature of the coolant is disposed in a cylinder block 8 of the engine 1. The coolant temperature sensor 9 generates an analog voltage signal in response to the temperature THW of the coolant, and transmits this signal to the A/D converter 101 of the control circuit 10.

A three-way reducing and oxidizing catalyst converter 12, which simultaneously removes three pollutants, CO, HC and $NO_x$ from the exhaust gas is provided in an exhaust system on the downstream-side of an exhaust manifold 11.

A air-fuel ratio sensor 14 for detecting the concentration of oxygen composition in the exhaust gas is provided in an exhaust pipe 13 downstream of the catalyst converter 12. This air-fuel ratio sensor 14 generates an output voltage signal and transmits the signal to the A/DF converter 101 of the control circuit 10.

Reference 15 designates a throttle valve, and 16 designates a throttle sensor which incorporates an idle switch for detecting a time at which the throttle valve 15 is fully closed. The output LL of the idle switch is supplied to the I/O interface 102 of the control circuit.

The control circuit 10, which may be constructed by a microcomputer, further comprises a central processing unit (CPU) 103, a read only memory (ROM) 104 for storing a main routine and interrupt routines such as a fuel injection routine, an ignition timing routine and constants, etc., a random access memory 105 (RAM) for storing temporary data, a backup RAM 106, a clock generator 107 for generating various clock signals, a down counter 108, a flip-flop 109, and a drive circuit 110 and the like.

Note, that a battery (not shown) is connected directly to the backup RAM 106, and therefore, the content thereof is not erased even when the ignition switch (not shown) is turned off.

The down counter 108, flip-flop 109, and drive circuit 110 are used for controlling the fuel injection valve 7. Namely, when a fuel injection amount TAU is calculated in a TAU routine, as explained later, the amount TAU is preset in the down counter 108, and at the same time the flip-flop 109 is set, and as a result, the drive circuit 110 initiates the activation of the fuel injection valve 7. On the other hand, the down counter 108 counts up the clock signal from the clock generator 107, and finally, a logic "1" signal is generated from the borrow-out terminal of the down counter 108, to reset the flip-flop 109, so that the drive circuit 110 stops the activation of the fuel injection valve 7, whereby an amount of fuel corresponding to the fuel injection amount TAU is injected into the fuel injection valve 7.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q from the airflow meter 3 and the coolant temperature data THW from the coolant sensor 9 are fetched by an A/D conversion routine(s) executed at predetermined intervals, and then stored in the RAM 105; i.e., the data Q and THW in RAM 105 are renewed at predetermined intervals.

Figure 2A:
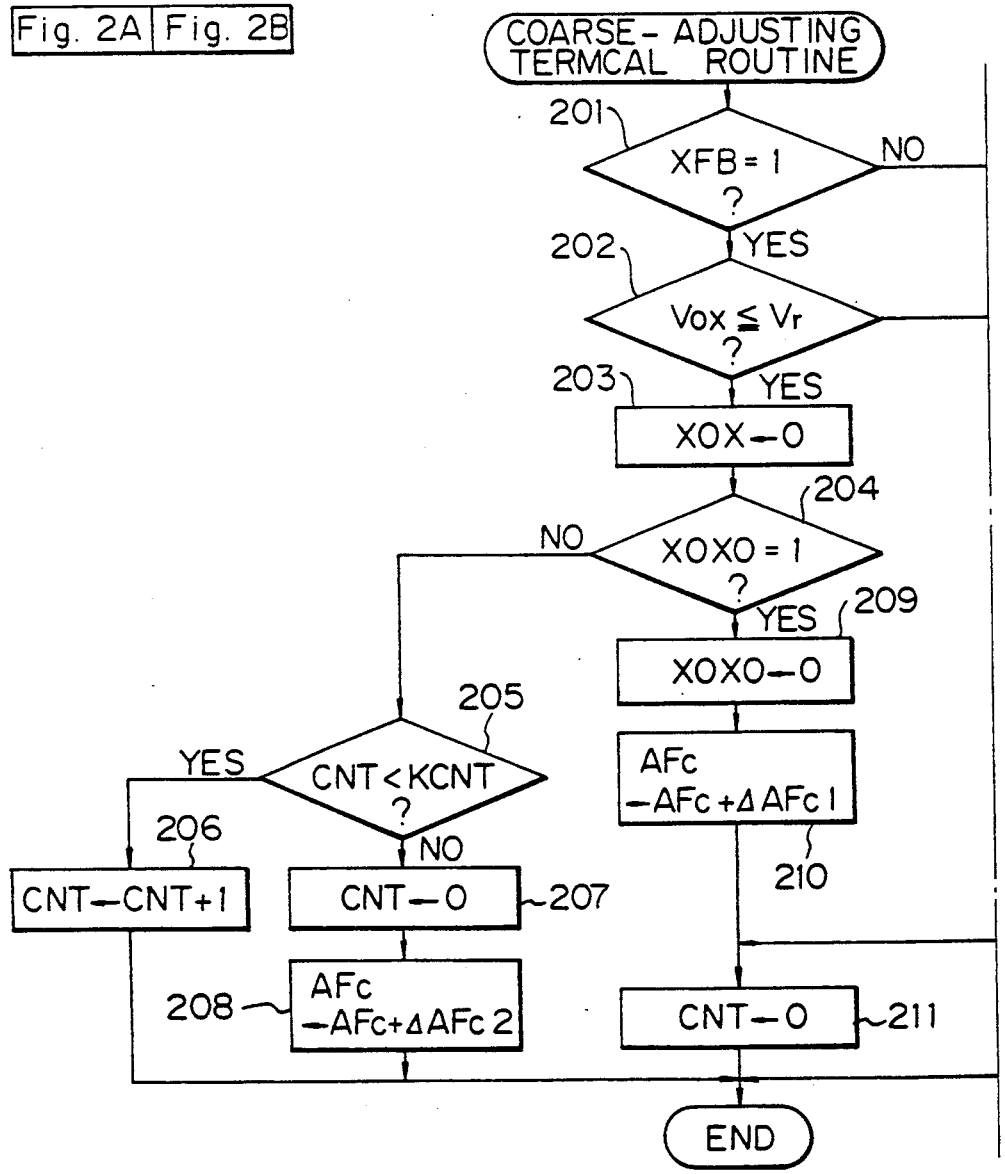
FIGS. 2, 3, 4, 5, 6, 7, 8, 10, 11 and 12 are flow charts showing the operation of the control circuit of FIG. 1; and, FIG. 9 is a timing diagram for explaining the control operation of the present invention.
Figure 2B:
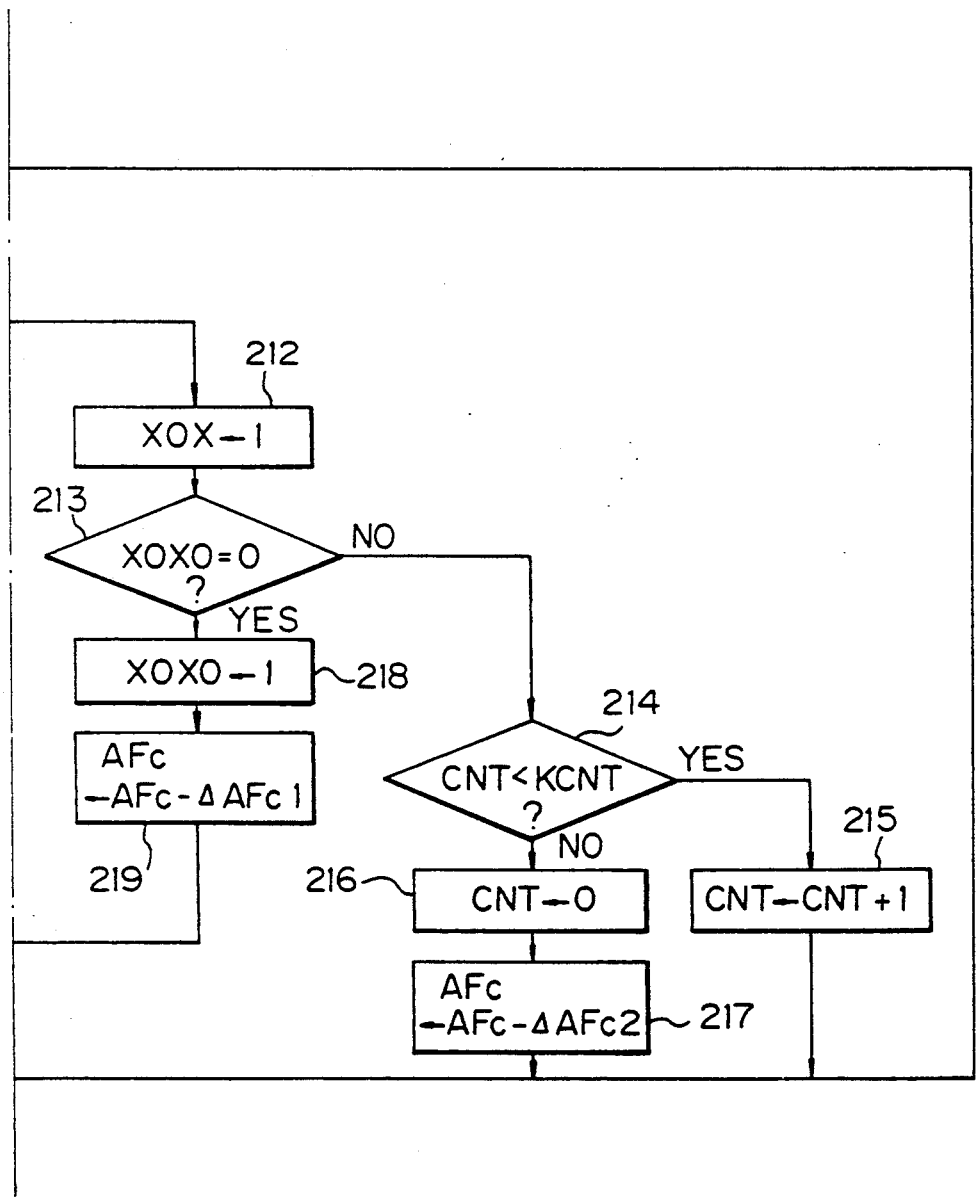

FIG. 2 is a routine for calculating a coarse-adjusting term AFc in accordance with the output voltage Vox of the air-fuel ratio sensor 14, and is executed at predetermined intervals such as 16 ms.

At step 201, it is determined whether or not the flag XFB is "1", which means that the conditions for the feedback control are established.

For example, the feedback control is inhibited under the following conditions.

i) the engine is in a fuel cut-off state;

ii) the engine is in a state of waiting for a predetermined interval after a fuel cut-off condition has been released;

iii) the engine is in a fuel increase condition, to prevent an overheating of the catalyst converter;

iv) the engine is in a power increase condition.

In the above-mentioned conditions, when the flag XFB is "0", which shows that the feedback control conditions are not satisfied, this routine is directly completed.

If the flag XFB is "1", which shows that the feedback control conditions are satisfied, the control proceeds to step 202, and the output of the air-fuel ratio sensor 14 Vox is compared with the predetermined reference Vr, e.g., 0.45 V.

If Vox is smaller than Vr, which means that the current air-fuel ratio is lean, the control proceeds to step 203 and "0" is set in the air-fuel ratio flag XOX. Then, at step 204, it is determined whether or not a previous air-fuel ratio flag XOXO is "1" (rich), i.e., the air-fuel ratio flag XOX is inverted. If the previous air-fuel ratio XOXO is "0", which means that the rich state is maintained, the control proceeds to step 205.

In step 205, it is determined whether or not the counter CNT, which determines the continuance of the rich or lean state, is smaller than the predetermined value KCNT. If CNT is smaller than KCNT, the control proceeds to step 206 and CNT is incremented, and this routine is then completed.

If CNT is equal to KCNT, the control proceeds to step 207, and "0" is set in the counter CNT. Then at step 208, the coarse-adjusting term AFc is increased by $\Delta AFc2$, which means that the coarse-adjusting term is integrally increased at predetermined intervals (for example 16 ms)×KCNT, and this routine is then completed.

When XOXO is "1", which means that XOXO is inverted, the control proceeds to step 209, and "0" is set in XOXO. Then at step 210, $\Delta AFc1$ is added to the coarse-adjusting term AFc, which means that the coarse-adjusting term AFc is proportionally increased when the air-fuel ratio is inverted from the rich state to the lean state. At step 211, the counter CNT is reset to "0", and this routine is then completed.

When the output voltage Vox of the air-fuel ratio sensor 14 is larger than the reference Vr, the control proceeds to step 212, and "1" is et in the air-fuel ratio flag XOX. Then at step 213, it is determined whether or not the previous air-fuel ratio flag XOXO is "0".

If XOXO is "1", the control proceeds to step 214, and the counter CNT is compared with KCNT.

When CNT is smaller than KCNT, the control proceeds to step 215 and CNT is incremented and this routine is completed.

If CNT is equal to KCNT, the control proceeds to step 216, and "0" is set in the CNT. Then at step 217, $\Delta AFc2$ is subtracted from the coarse-adjusting term AFc, and this routine is completed.

If XOXO is "0", the control proceeds to step 218, and "1" is set in XOXO. At step 219, $\Delta AFc1$ is subtracted from the coarse-adjusting term AFc, and the control then proceeds to step 211.

As a result, if the actual air-fuel ratio approaches the stoichiometric air-fuel ratio, the integral action does not function, and only the proportional action functions as the self-oscillating term because the counter is reset within the predetermined period KCNT at step 211.

When the air-fuel ratio is far from the stoichiometric air-fuel ratio, however, it takes a long time to converge the air-fuel ratio to the stoichiometric air-fuel ratio with a only the coarse-adjusting term, and it is impossible to lower the HC, Co and $NO_x$ emissions during this time.

To solve this problem, the air-fuel ratio is compensated with the $O_2$ storage term.

Figure 3B:
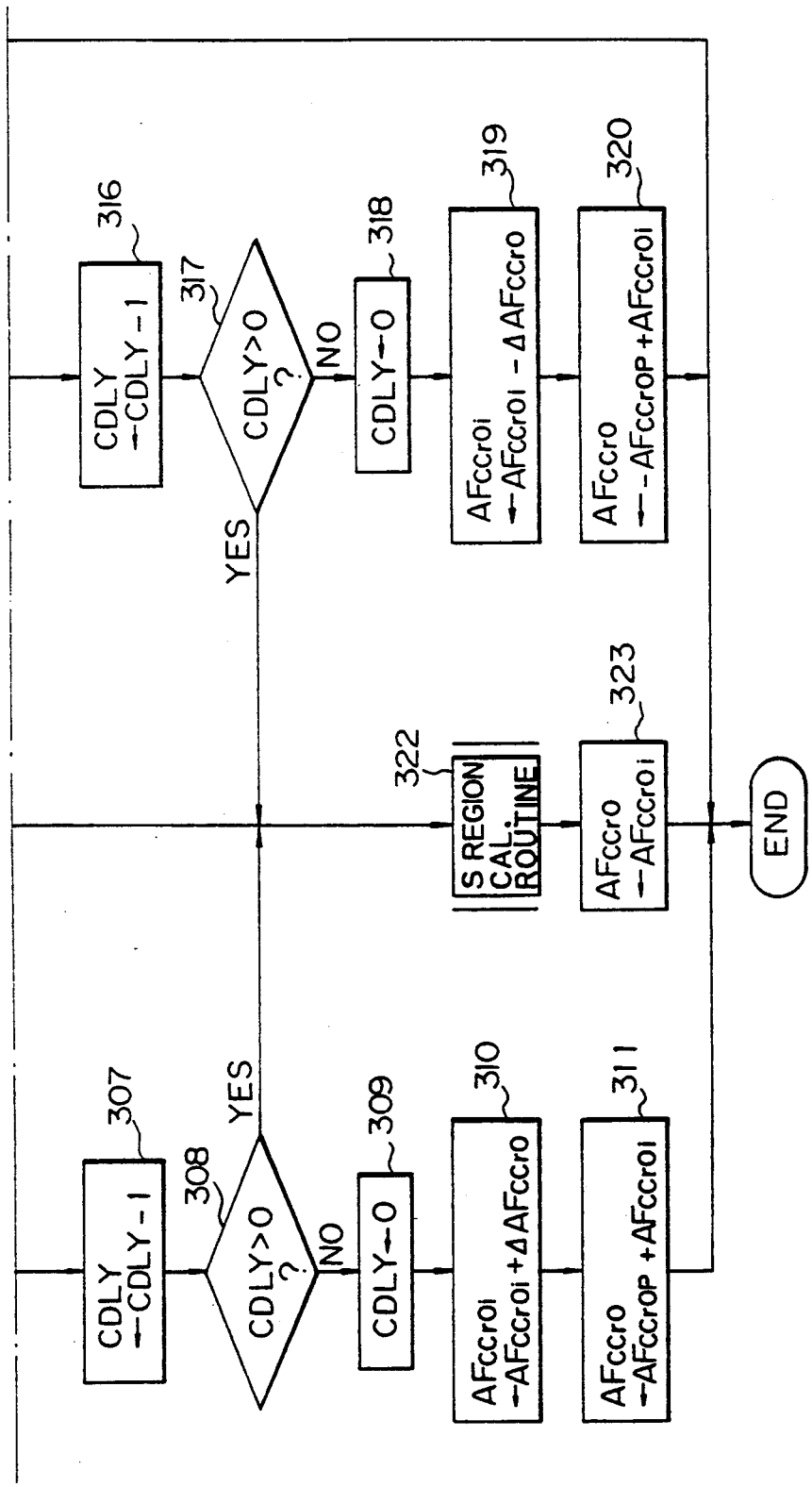

FIG. 3 is the routine for calculating the $O_2$ storage term, and is executed at predetermined intervals such as 64 ms.

At step 301, it is determined whether or not the flag XFB is "1". If XFB is "0", this routine is immediately completed. If XFB is "1", the control proceeds to step 302, at which Vox is fetched through the A/D converter 101.

At step 303, it is determined whether or not the output voltage Vox of the air-fuel ratio sensor 14 is smaller than the first threshold value $V_1$. If Vox is larger than $V_1$, at step 312 it is determined whether or not Vox is larger than the second threshold value $V_2$. Note, a range of the output Vox of the air-fuel ratio sensor 14 is divided into three regions, as follows:

"L" (lean) region: 0(Volt) ~ $V_1$
"S" (stoichiometric) region: $V_1$ ~ $V_2$
"R" (rich) region: $V_2$ ~ 1(Volt)

As a result, when Vox is smaller than $V_1$, which means that the current air-fuel ratio is in the "L" region, the control proceeds to step 304, and it is determined whether or not a flag XS, which shows that the output of the air-fuel ratio sensor was in the "S" region at the previous execution of this routine, is "1".

Figure 7:
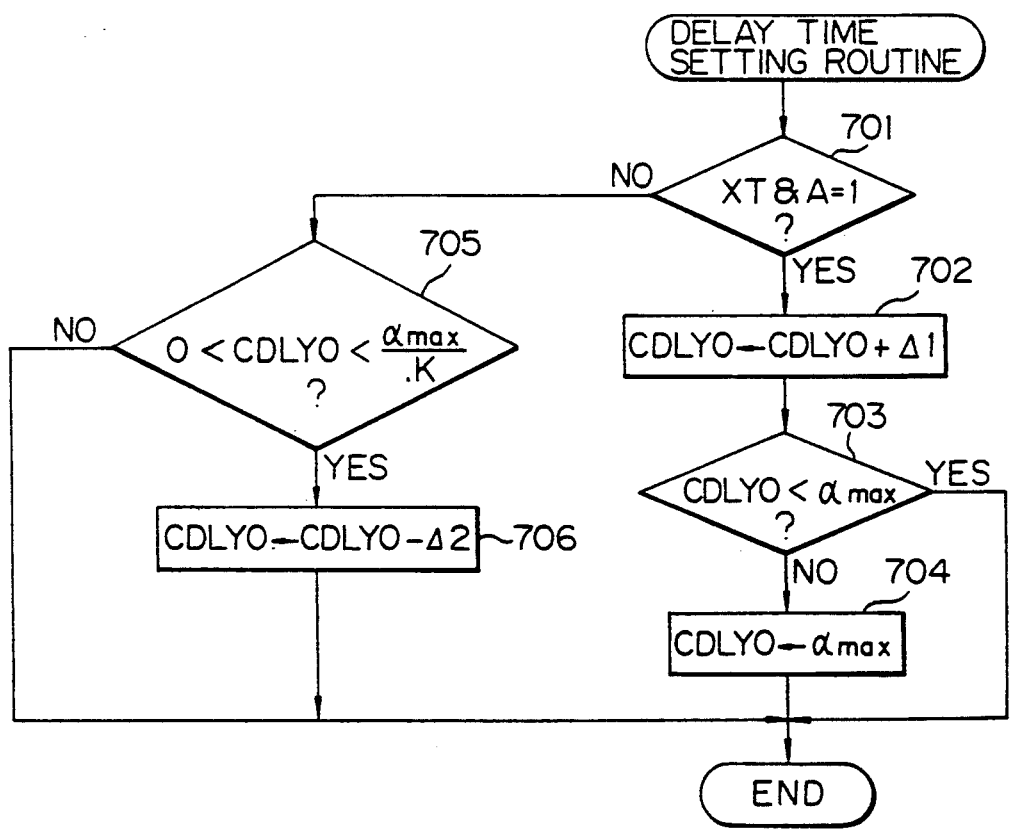

If XS is "1", which means that the output of the air-fuel ratio sensor is transferred from the "S" region to the "L" region, CDLYO, which is determined by a routine shown in FIG. 7, is set in a delay counter CDLY, and at step 306, "0" is set in the flag XS and the control proceeds to step 307.

If XS is "0", which means that the output of the air-fuel ratio sensor is remaining in the "L" region, the control directly proceeds to step 307.

At step 307, the delay counter CDLY is decremented and at step 308, it is determined whether or not the CDLY is a positive value.

If the CDLY is not a positive value, which means that the predetermined interval T calculated by a following equation has passed after the transfer from the "S" region to the "L" region, the control proceeds to step 309.

$$T = CDLYO \times \text{routine executing interval} \quad (1)$$

At step 309, "0" is set in the CDLY and at step 310, an integral $O_2$ storage term AFccroi is gradually increased by $$AFccroi \leftarrow AFccroi + \Delta AFccro \text{ (definite)} \quad (2)$$

Then, at step 311, the $O_2$ storage term AFccro is calculated by $$AFccro \leftarrow AFccrop + AFccroi \quad (3)$$

Therefore, the $O_2$ storage term AFccro is greatly increased by AFccrop, then gradually increased with the gradual changing speed $\Delta AFccro$.

If the output voltage Vox is larger than the second threshold value $V_2$, which means that the current air-fuel ratio is in the "R" region, the control proceeds to step 320 through step 312.

This process is same as the process which is executed from step 304 to step 311, except followings.

At step 319, the integral $O_2$ storage term AFccroi is gradually decreased by $$AFccroi \leftarrow AFccroi - \Delta AFccro \text{ (definite)} \quad (4)$$

At step 320, the $O_2$ storage term AFccro is calculated by $$AFccro \leftarrow -AFccrop + AFccroi \quad (5)$$

If the current air-fuel ratio enters the "S" region as the result of an increase or decrease of the $O_2$ storage term AFccro, the control proceeds to step 321, where "1" is set in the flag XS, and to step 322, where a calculation for the "S" region is executed.

Note, the control also proceeds to step 322 when the CDLY is determined to be a positive value at step 308 or step 317.

After the calculation for the "S" region is executed, the control proceeds to step 323, where AFccro is made AFccroi, and the routine is then completed.

Figure 4B:
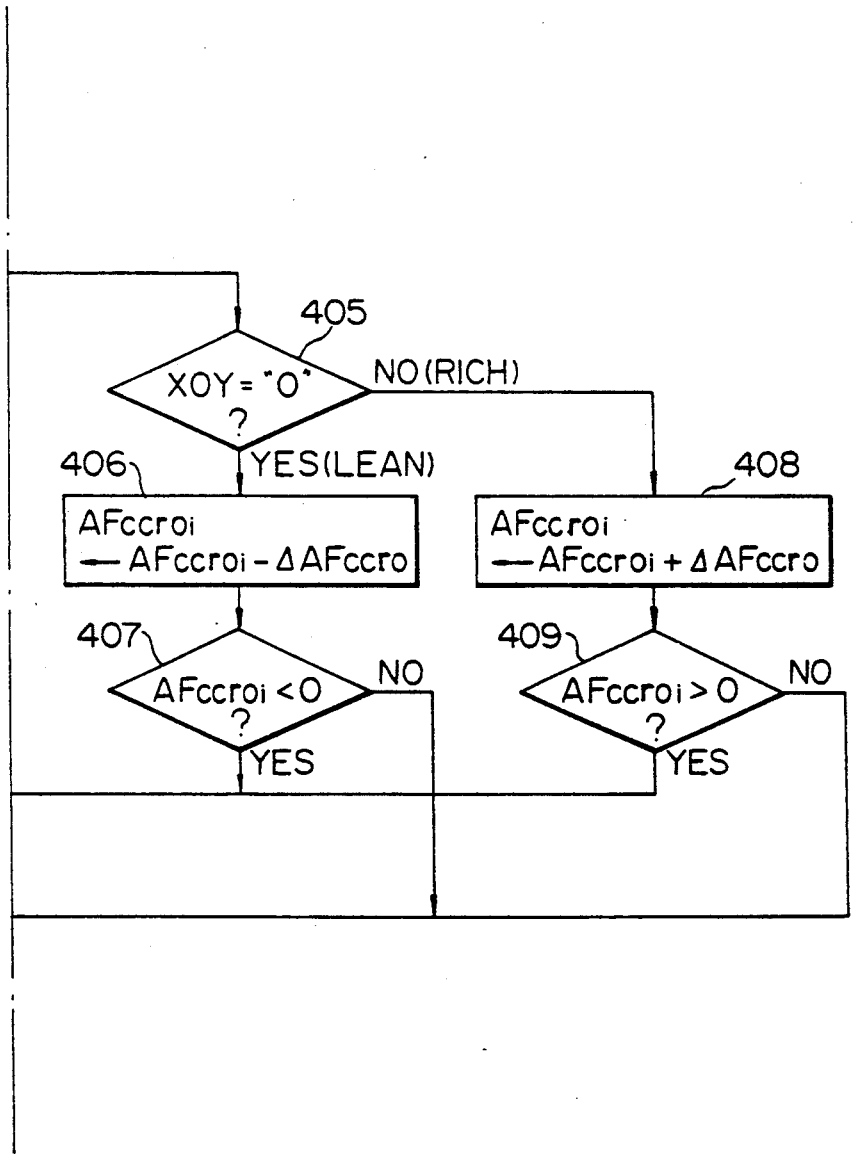

FIG. 4 is the routine for the process of step 322, which is executed together with the routine shown FIG. 3.

At step 401, it is determined whether or not Vox is smaller than Vr. If Vox is smaller than Vr, the control proceeds to step 402 and "0" is set in XOY, and then goes to step 404. If Vox is larger than Vr, the control proceeds to step 403 and "1" is set in XOY, and then goes to step 404.

At step 404, it is determined whether or not the flag XOY is equal to the flag XOYO.

If XOY is equal to XOYO, which means that the air-fuel ratio is in the same state, the control proceeds to step 405 and it is determined whether or not XOY is "0".

When XOY is "0", which means that the current air-fuel ratio is lean, the control proceeds to step 406, where $\Delta AFccro$ is subtracted from the integral $O_2$ storage term AFccroi, and to step 407, where it is determined whether or not AFccroi is a negative value.

If AFccroi is a negative value, the control proceeds to step 410 where AFccro is cleared to avoid an overcompensation, and then goes to step 411.

If AFccroi is not a negative value, the control proceeds directly to step 411, where XOY is replaced by XOYO, and the routine is then completed.

When XOY is "1", which means that the current air-fuel ratio is rich, the control proceeds to step 408, where $\Delta AFccro$ is added to the integral $O_2$ storage term AFccroi, and to step 409, where it is determined whether or not AFccroi is a positive value.

If AFccroi is a positive value, the control proceeds to step 410 where AFccro is cleared to avoid an overcompensation, and then goes to step 411.

If AFccroi is not a positive value, the control proceeds directly to step 411.

Note, the delay counter CDLYO is determined by a routine for determining a deterioration of the catalyst converter and a routine for setting a delay time.

Figure 5A:
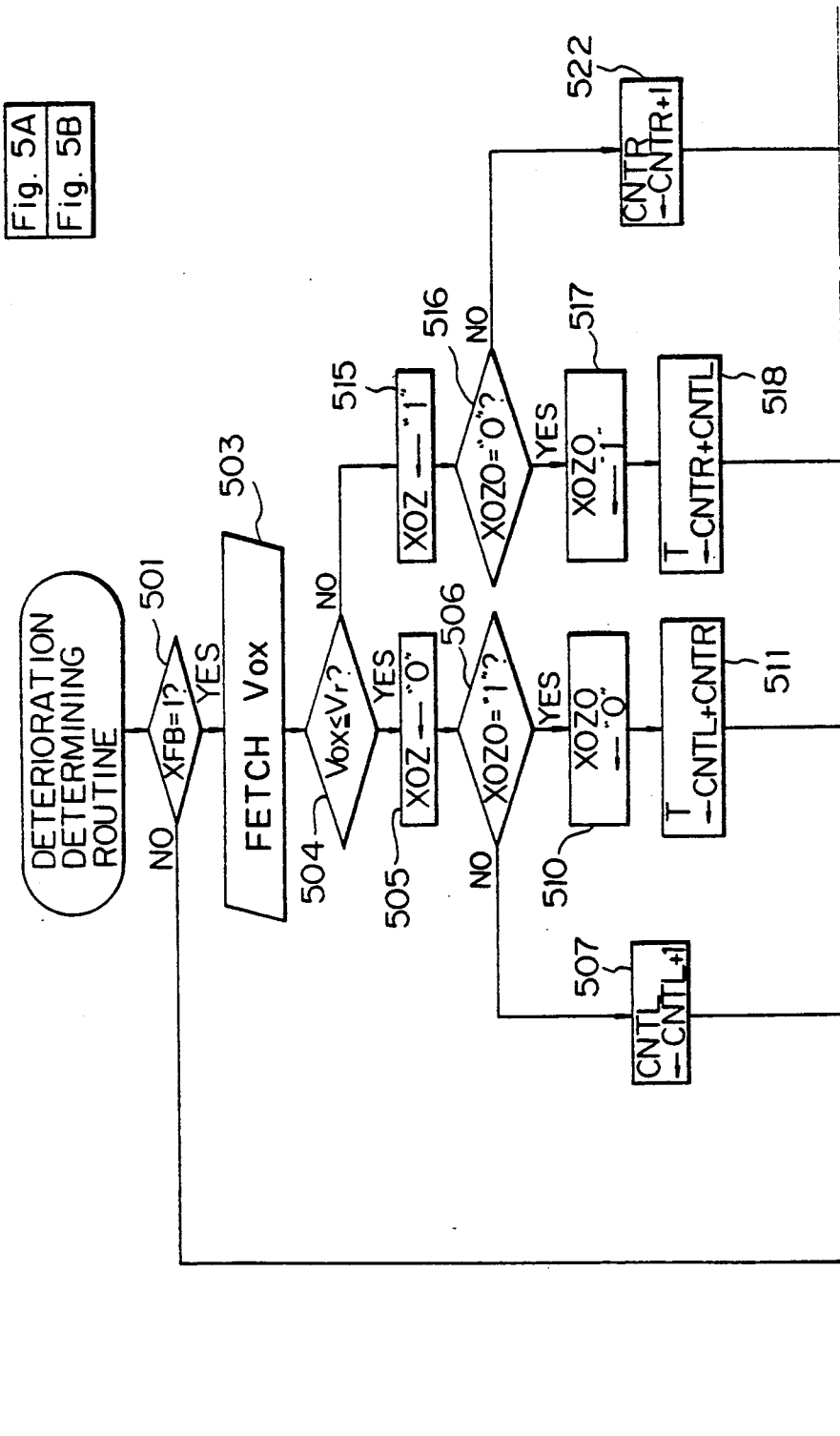

FIG. 5 is a routine for determining the deterioration of the catalyst converter, and is executed at predetermined intervals such as 4 ms.

At step 501, it is determined whether or not the flag XFB is "0", which means that the conditions of the feedback control are established.

If the flag XFB is "0", the control proceeds to step 502, where the flag XT&A is cleared, and this routine is completed.

If the flag XFB is "1", the control proceeds to step 503. At step 503, an A/D conversion is performed upon the output voltage Vox of the air-fuel ratio sensor 14, and the A/D converted value thereof is then fetched from the A/D converter 101. Then, at step 404, the voltage Vox is compared with the reference voltage Vr such as 4.5 V, to thereby determine whether the current air-fuel ratio detected by the air-fuel ratio sensor 14 is on the rich side or the lean side with respect to the stoichiometric air-fuel ratio.

If Vox is smaller than Vr, which means that the current air-fuel ratio is lean, the control proceeds to step 505 and "1" is set in the air-fuel ratio flag XOZ. Then at step 506, it is determined whether or not a previous air-fuel ratio flag XOZO is "1" (rich), i.e., the air-fuel ratio flag XOZ is inverted.

When the air-fuel ratio XOZ is "0", which means that the rich state is continuing, the control proceeds to step 507, where the counter CNTL which designates the interval for holding the lean state, is incremented. Then at step 508, it is determined whether or not the output voltage Vox of the air-fuel ratio sensor is larger than Vmin, where the minimum output voltage is stored. If Vox is smaller than Vmin, the control proceeds to step 509, which makes Vmin become Vox, and the routine is then completed.

If the lean state continues, CNTL is incremented at every execution, and the minimum value of the output voltage of the air-fuel ratio sensor is stored in Vmin.

As a result of this control, if the current air-fuel ratio is inverted from the lean side to the rich side, the output voltage of the air-fuel ratio sensor Vox becomes larger than Vr. Then the control proceeds to step 515, and "1" is set in the flag XOZ.

At step 516, it is determined whether or not a previous air-fuel flag XOZO is "0" (lean), i.e., the air-fuel ratio flag is inverted. As a result, only when the air-fuel ratio flag is inverted, does the control proceeds to step 517, and "1" is set in the flag XOZO. Then at step 518, the inverting interval is calculated by the following equation.

$$T = CNTL + CNTR \qquad (6)$$

Then the control proceeds to step 519, and CNTR is cleared. Then, at step 520, the amplitude of the output of the air-fuel ratio sensor A is calculated by the following equation.

$$A = Vmax - Vmin \qquad (7)$$

At step 521, Vmax is cleared, and the control then proceeds to step 525.

At step 525, it is determined whether or not the flag LL is "1". If the flag LL is "1", which means that the engine is in an idling state, the control proceeds to step 529, and "0" is set in the flag XT&A, and the routine is completed.

If LL is "0", which means that the engine is under a normal operation, the control proceeds to step 526, which determines whether or not the inverting interval T is smaller than the predetermined period $T_0$. If T is larger than $T_0$, the control proceeds to step 529. If T is smaller than $T_0$, the control proceeds to step 527, which determines whether or not the amplitude A is larger than the pre-determined value $A_0$.

If A is smaller than $A_0$, the control proceeds to step 529. If A is larger than $A_0$, the control proceeds to step 528, and "1" is set in the flag XT&A.

Figure 6:
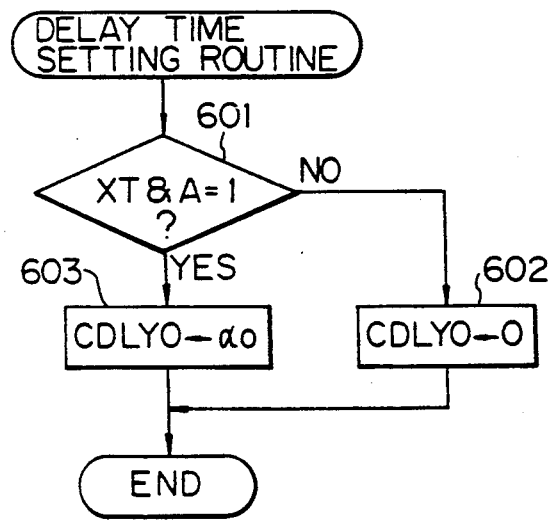

FIG. 6 is the routine for setting a delay time CDLYO, which is an interval from a time at which the current air-fuel ratio is outside the first threshold value $V_1$ or the second threshold value $V_2$ to a time at which proportional storage term is initiated when the catalyst converter is determined to have been deteriorated.

At step 601, it is determined whether or not the flag XT&A is "1". If XT&A is "0", at step 602, "0" is set in CDLYO. If XT&A is "1", at step 603, "$\alpha_0$" (definite) is set in CDLYO.

Note, it is possible to vary CDLYO in accordance with degree of deterioration of the catalyst converter. FIG. 7 is the routine for varying CDLYO.

At step 701, it is determined whether or not the flag XT&A is "1". If XT&A is "1", the control proceeds to step 702, and the CDLYO is increased by $\Delta 1$. At step 703, it is determined whether or not the CDLYO is larger than a maximum value $\alpha_{max}$. Only when the CDLYO is larger than $\alpha_{max}$, is the CDLYO made $\alpha_{max}$ at step 704.

If XT&A is "0", the control proceeds to step 705, and it is determined whether or not CDLYO satisfies the following relationship.

$$0 \leq CDLYO < \alpha_{max}/k \qquad (8)$$

If the relationship is satisfied, the control proceeds to step 706, and CDLYO is decreased by $\Delta 2$.

If the relationship is not satisfied, CDLYO is not varied. This means that CDLYO must be a positive value, and once CDLYO has been increased over the value $\alpha_{max}/k$, CDLYO is not decreased even when the catalyst converter is determined not to be deteriorated.

Figure 8:
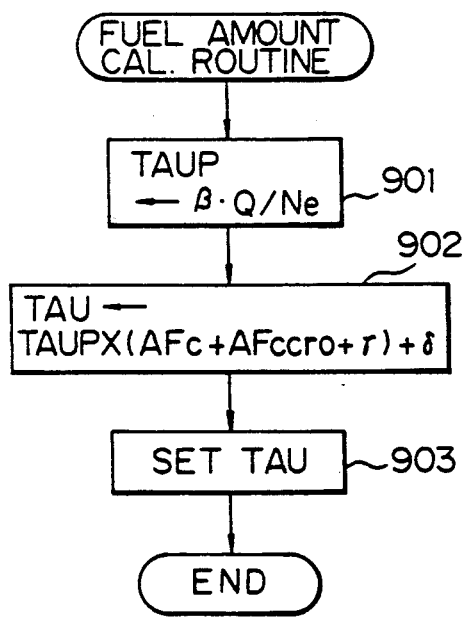

FIG. 8 is the routine for calculating the fuel injection amount. At step 801, the basic fuel injection amount TAUP is calculated based on the intake air-flow Q measured by the air-flow meter 3 and the engine rotating speed Ne determined by the output of the crank angle sensors 5 and 6 using the following equation.

$$TAUP = \beta \times Q/Ne \qquad (9)$$

where $\beta$ is a constant.

At step 802, the fuel injection amount is calculated by the following equation.

$$TAU = TAUP \times (AFc + AFccro + \gamma) + \delta \qquad (10)$$

where
AFc = the coarse-adjusting term
AFccro = the $O_2$ storage term
$\gamma, \delta$ = a constant At step 803, the fuel injection amount TAU is set to the counter 108 and the determined amount of fuel is then injected from injector 7.

Figure 9:
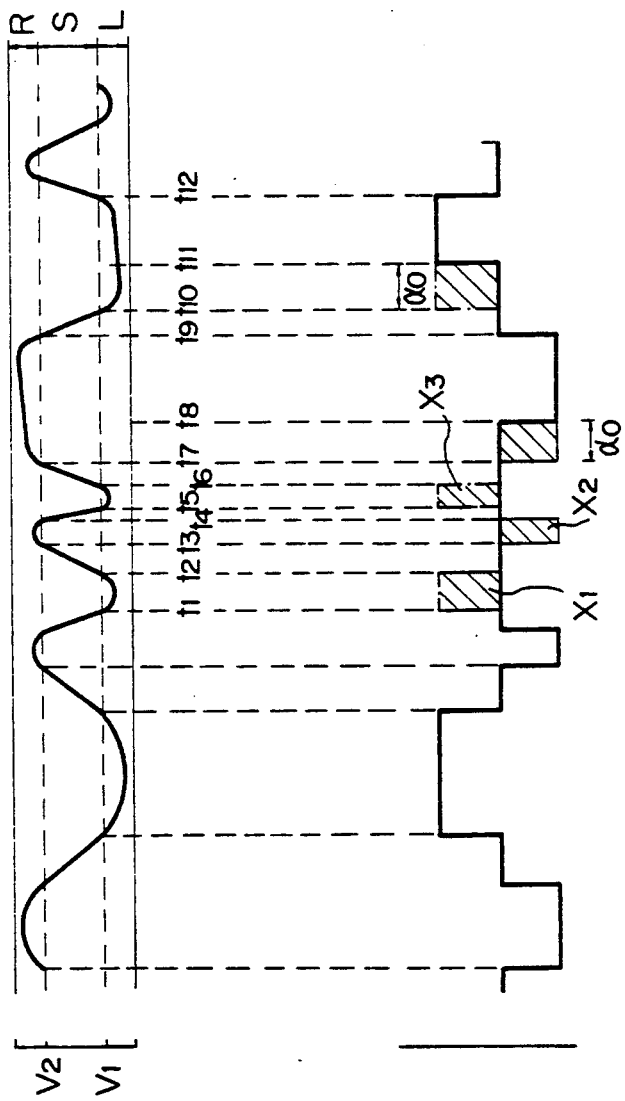

FIG. 9 is a timing diagram for explaining the control operation of the present invention, wherein the abscissa shows time and the ordinate shows the output of air-fuel ratio sensor and the value of the $O_2$ storage term.

If "0" is set in the CDLYO before time $t_1$ in FIG. 9, the $O_2$ storage term is greatly decreased as soon as the output of the air-fuel ratio sensor enters the "R" region or is greatly increased as soon as the output of the air-fuel ratio sensor enters the "L" region.

If the catalyst converter is found to be deteriorated at $t_1$, the CDLY is set as $\alpha_0$. The $O_2$ storage term functions at a time when $\alpha_0$ has passed from $T_1$, but as an interval between $T_1$ and $t_2$ is shorter than $\alpha_0$, the great change of the $O_2$ storage term can be avoided. The regions $X_2$ and $X_3$ are also negated. But when an interval between $t_7$ and $t_9$, while the rich state is being maintained, is longer than $\alpha_0$, the proportional $O_2$ storage term functions at $t_8$ when $\alpha_0$ has passed $t_7$. For the same reason, the proportional $O_2$ storage term functions at $t_{11}$ when $\alpha_0$ has passed $t_9$.

Note, it is possible to add the self-oscillating-term AFs to the above equation (10), for a more positive use of the $O_2$ storage effect of the catalyst converter as already suggested by the present inventors (see Japanese Unexamined Patent Publication (Kokai) No. 1-6641 published on Mar. 31, 1989).

Figure 10:
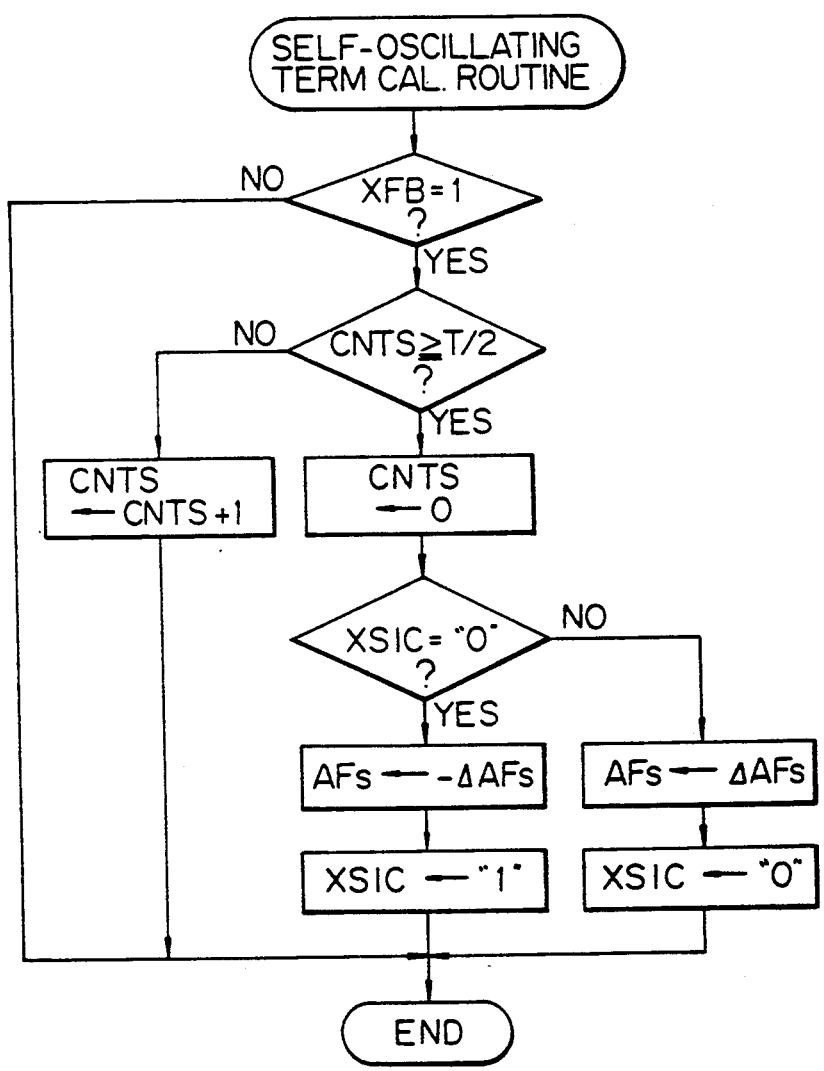
Figure 11:
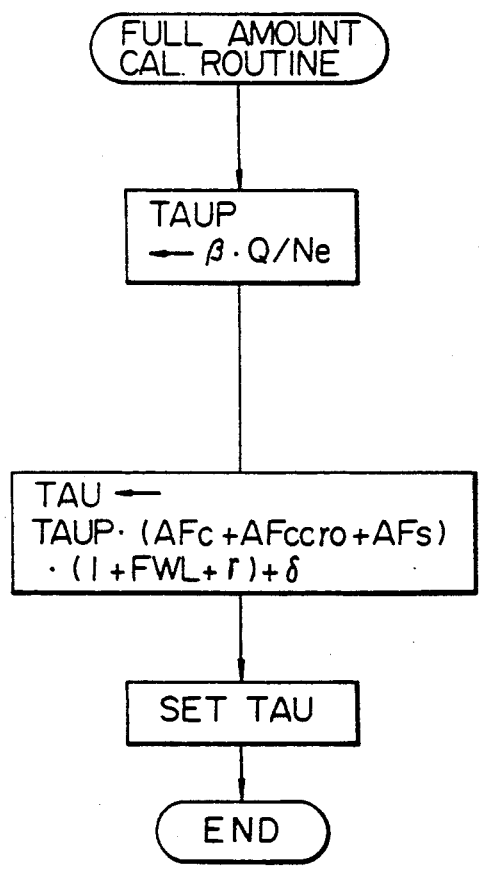

FIG. 10 shows the routine for calculating the self-oscillating term AFs, and FIG. 11 shows the routine for calculating the fuel injection amount TAU in this case.

Note, the present inventors have also suggested that the amplitude and period of the self-oscillating term can be changed according to whether the engine is in an idling operation or in a non-idling operation (see U.S. Pat. No. 487,454 filed on Mar. 1, 1990 or Japanese Unexamined Patent Publication (Kokai) No. 2-230934 published on Sept. 13, 1990).

Figure 12A:
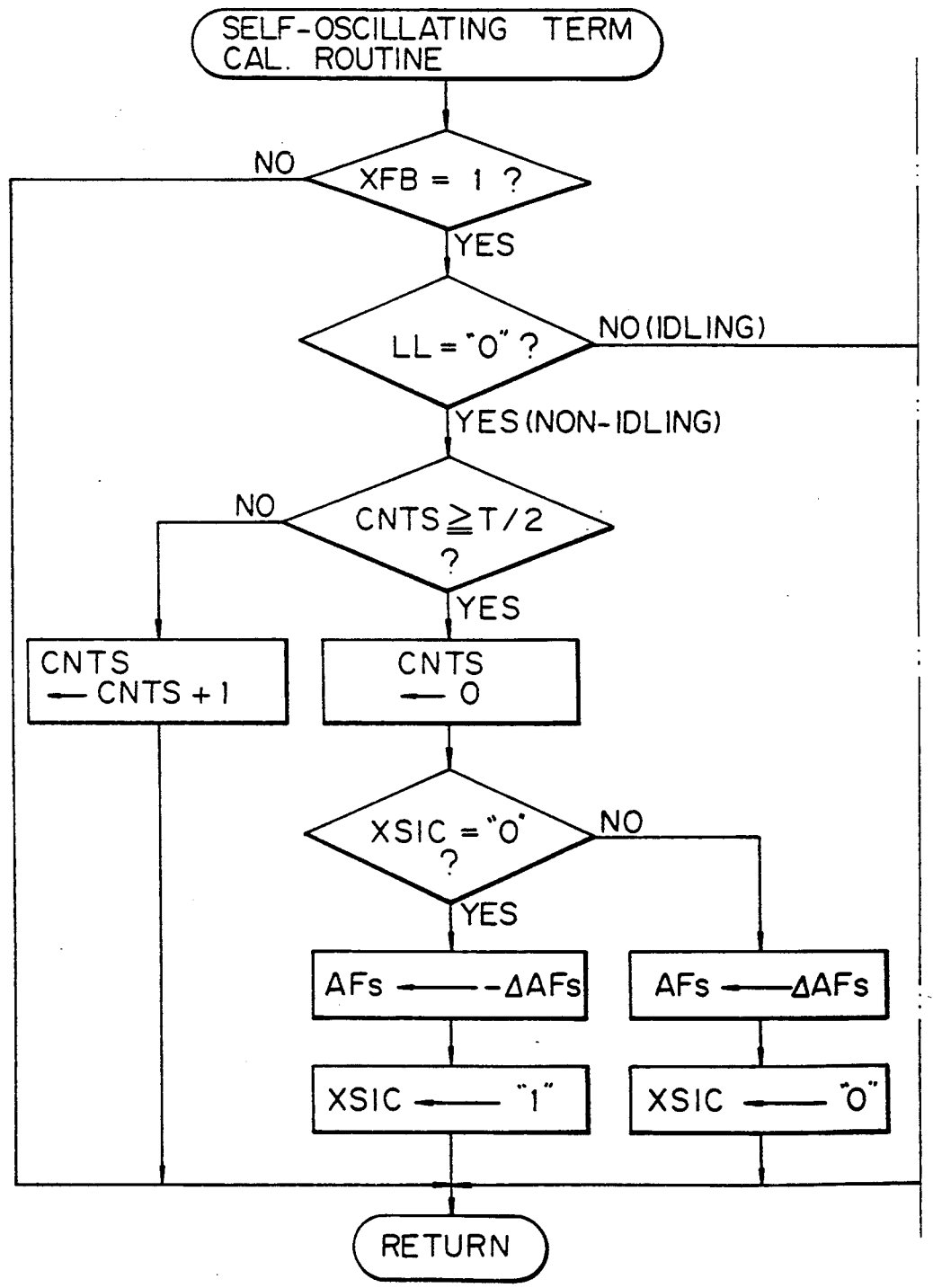
Figure 12B:
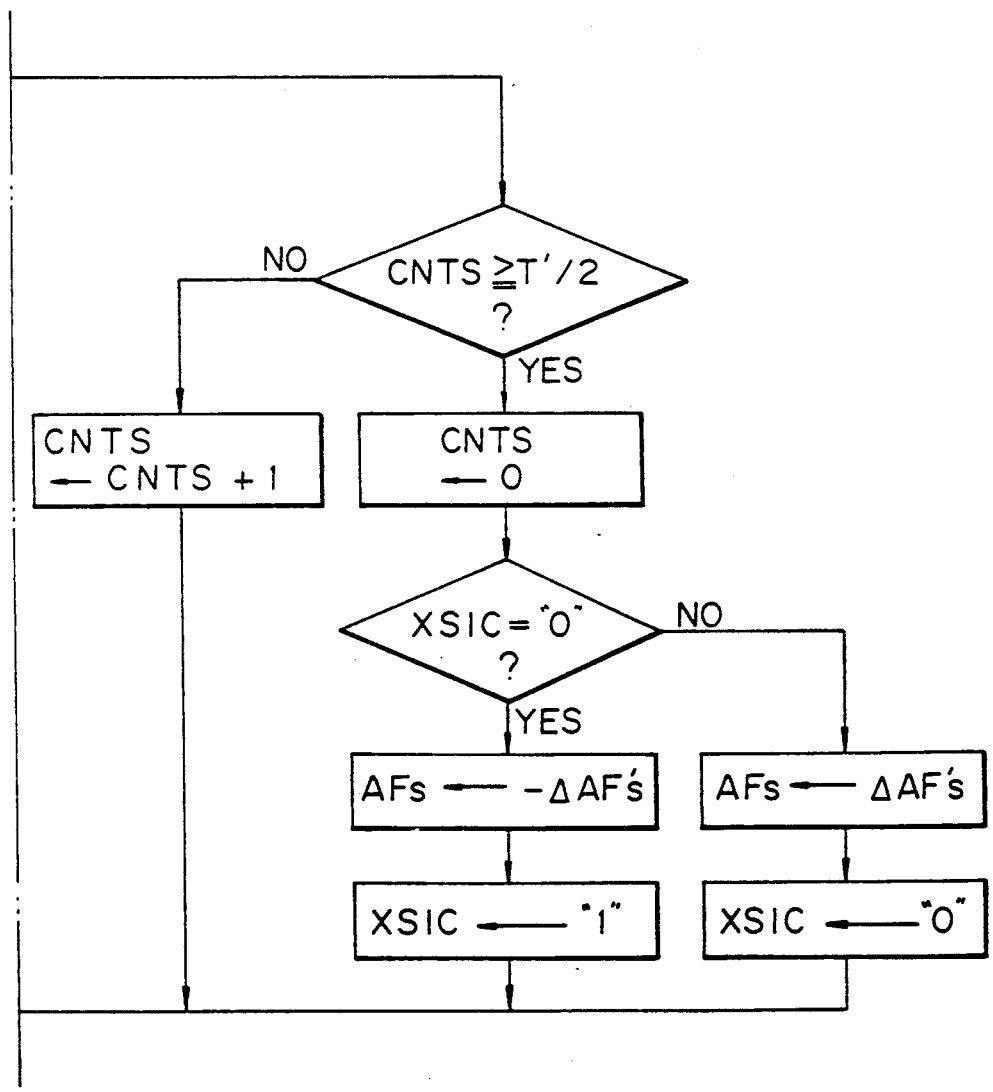

FIG. 12 shows the routine for calculating the self-oscillating term AFs in this case.

Note, a Karman vortex sensor, hard-ware type flow sensor, and the like can be used instead of the air-flow meter.

Although, in the above-mentioned embodiments, a fuel injection amount is calculated on the basis of the intake air amount and engine speed, it can be also calculated on the basis of the intake air pressure and engine speed, or the throttle opening and the engine speed.

I claim:

1. A method of controlling an air-fuel ratio in an internal combustion engine having a three-way catalyst converter for removing pollutants in the exhaust gas of said engine and an air-fuel ratio sensor disposed downstream of said three-way catalyst converter for detecting a specific component in the exhaust gas, said method comprising the steps of:

greatly changing a coarse-adjusting term when the output of said air-fuel ratio sensor is inverted from the rich state to the lean state and vice versa, and gradually changing said coarse-adjusting term when the output of said air-fuel ratio sensor remains in the same state;

greatly changing a proportional amount of an $O_2$ storage adjusting term when the output of said air-fuel ratio sensor is under a first threshold value which is smaller than a value corresponding to the stoichiometric air-fuel ratio or over a second threshold value which is larger than a value corresponding to the stoichiometric air-fuel ratio;

determining whether or not said catalyst converter is deteriorated;

delaying an initiating timing of said $O_2$ storage term for a predetermined interval when said catalyst convertor is determined to be deteriorated; and adjusting an actual air-fuel ratio in accordance with said coarse-adjusting term and said $O_2$ storage term.

2. A method as set forth in claim 1, wherein said initiating timing is varied in accordance with a degree of deterioration of said catalyst converter.

3. A method as set forth in claim 1, further comprising a step of gradually changing said $O_2$ storage term.

4. A method as set forth in claim 1, wherein said catalyst converter deterioration determining step comprises a step of:

determining whether or not an inverting interval, which is an interval from a time at which the output of the said air-fuel ratio sensor is inverted from the rich side to the lean side or vice versa to a time at which it is again inverted in the same direction, is shorter than a predetermined value.

5. A method as set forth in claim 1, wherein said catalyst converter deterioration determining step comprises a step of:

determining whether or not an amplitude of said output of said air-fuel ratio sensor is larger than a predetermined value.

6. A method as set forth in claim 1, further comprising a step of generating a self-oscillating term having a predetermined amplitude and a predetermined period, to thereby adjust said actual air-fuel ratio in accordance with said self-oscillating term.

7. A method as set forth in claim 6, further comprising the steps of:

determining whether or not said engine is in an idling state;

lowering said predetermined amplitude of said self-oscillating term when said engine is in said idling state;

increasing said predetermined period of said self-oscillating term when said engine is in said idling state.

8. An apparatus for controlling an air-fuel ratio in an internal combustion engine having a three-way catalyst converter for removing pollutants in the exhaust gas of said engine and an air-fuel ratio sensor disposed downstream of said three-way catalyst converter for detecting a specific component in the exhaust gas, said apparatus comprising:

means for greatly changing a coarse-adjusting term when the output of said air-fuel ratio sensor is inverted from a rich state to a lean state and vice versa, and gradually changing said coarse-adjusting term when the output of said air-fuel ratio sensor remains in the same state;

means for greatly changing a proportional amount of an $O_2$ storage adjusting term when the output of said air-fuel ratio sensor is under a first threshold value which is smaller than a value corresponding to the stoichiometric air-fuel ratio or over a second threshold value which is larger than a value corresponding to the stoichiometric air-fuel ratio;

means for determining whether or not said catalyst converter is deteriorated;

means for delaying an initiating timing of said $O_2$ storage term for a predetermined interval when said catalyst convertor is determined to be deteriorated; and, means for adjusting an actual air-fuel ratio in accordance with said coarse-adjusting term and said $O_2$ storage term.

9. An apparatus as set forth in claim 8, wherein said initiating timing is varied in accordance with a degree of deterioration of said catalyst converter.

10. An apparatus as set forth in claim 8, further comprising means for gradually changing said $O_2$ storage term.

11. An apparatus as set forth in claim 8, wherein means for said catalyst converter deterioration determining comprises:

means for determining whether or not an inverting interval, which is an interval form a time at which the output of the said air-fuel ratio sensor is inverted from the rich state to the lean state or vice versa to a time at which it is again inverted in the same direction, is shorter than a predetermined value.

12. An apparatus as set forth in claim 8, wherein means for said catalyst converter deterioration determining comprises:

means for determining whether or not an amplitude of said output of said air-fuel ratio sensor is larger than a predetermined value.

13. An apparatus as set forth in claim 8, further comprising means for generating a self-oscillating term having a predetermined amplitude and a predetermined period, to thereby adjust said actual air-fuel ratio in accordance with said self-oscillating term.

14. An apparatus as set forth in claim 13, further comprising:

means for determining whether or not said engine is in an idling state;

means for lowering said predetermined amplitude of said self-oscillating term when said engine is in said idling state;

means for increasing said predetermined period of said self-oscillating term when said engine is in said idling state.

* * * * *